United States Patent
Takai

(10) Patent No.: US 8,344,672 B2
(45) Date of Patent: Jan. 1, 2013

(54) MOTOR DRIVE CONTROL CIRCUIT

(75) Inventor: Kazumasa Takai, Kagamigahara (JP)

(73) Assignees: Sanyo Electric Co., Ltd, Osaka (JP); Sanyo Semiconductor Co., Ltd, Gunma (JP)

( * ) Notice: Subject to any disclaimer, the term of this patent is extended or adjusted under 35 U.S.C. 154(b) by 317 days.

(21) Appl. No.: 12/893,531

(22) Filed: Sep. 29, 2010

(65) Prior Publication Data
US 2011/0074321 A1    Mar. 31, 2011

(30) Foreign Application Priority Data
Sep. 30, 2009 (JP) ................. 2009-227710

(51) Int. Cl.
H02P 6/08 (2006.01)

(52) U.S. Cl. ........... 318/400.04; 318/400.1; 318/400.05; 318/400.09; 318/700

(58) Field of Classification Search ............. 318/400.04, 318/400.01, 400.05, 400.09, 700
See application file for complete search history.

(56) References Cited

U.S. PATENT DOCUMENTS
6,700,400 B2 * 3/2004 Atarashi ................. 318/400.01

FOREIGN PATENT DOCUMENTS
JP    2007-274760    10/2007

* cited by examiner

*Primary Examiner* — Walter Benson
*Assistant Examiner* — David Luo
(74) *Attorney, Agent, or Firm* — McDermott Will & Emery LLP

(57) ABSTRACT

A differential amplifier detects a coil current Is at the time of steady rotation of a synchronous motor. An application voltage S0 at this time is detected from an output of an ATT circuit and so on. With the use of the coil current Is which is detected, the application voltage S0 at that time, and a predetermined scaling factor As, an induced current Ib is obtained based on Ib=As·S0−Is. The application voltage to the motor is controlled based on the induced current Ib which is obtained.

5 Claims, 9 Drawing Sheets

MOTOR DRIVE CONTROL CIRCUIT

CROSS-REFERENCE TO RELATED APPLICATIONS

The entire disclosure of Japanese Patent Application No. 2009-227710 including specification, claims, drawings, and abstract, is incorporated herein by reference.

BACKGROUND

1. Technical Field

The present invention relates to a circuit for driving and controlling a synchronous motor.

2. Background Art

For control of a synchronous motor, it is important to detect the position of a rotor, and control a motor driving current in accordance with the rotor position which is detected.

As synchronous motors, IPMSM (Internal Permanent Magnetic Synchronous Motor), SPMSM (Surface Permanent Magnetic Synchronous Motor), PM (Permanent Magnetic), VR (Variable Reluctance), (HB) (Hybrid), BLDCM (Brushless Direct Current Motor) and so on are known. As a method of detecting the rotational position of these synchronous motors, a method in which various sensors such as a Hall device are used, and a sensor-less method in which a speed electromotive voltage (an induced voltage or counter electromotive voltage) is detected, are known.

Of these detection methods, the sensor-less method is more advantageous in consideration of cost and space, and therefore various proposals have been made concerning the sensor-less method. One of these proposals concerns a method using a speed electromotive voltage of a motor. For example, a method in which a vector operation is executed from the voltage and current of a motor stator and a motor model formula to estimate a position, a method in which the speed electromotive voltage is directly measured while the drive line of a motor is placed in a high impedance state for a predetermined period, and other methods are known.

However, in the method in which estimation is performed from a motor model formula, while it is necessary to set the inductance, direct-current resistance components and so on in the model formula as constants, setting of these constants would cause an error. Further, in the method in which a high impedance state is established, it is necessary to stop the motor drive output during a detection period, losing continuity of the electric current.

SUMMARY

According to the present invention, an induced electric current in the steady running state is detected from a coil current and a coil application voltage.

BRIEF DESCRIPTION OF THE DRAWINGS

Preferred embodiments of the present invention will be described in detail based on the following figures, wherein.

DETAILED DESCRIPTION

Preferred embodiments of the present invention will be described in detail with reference to the accompanying drawings.

Figure 1:
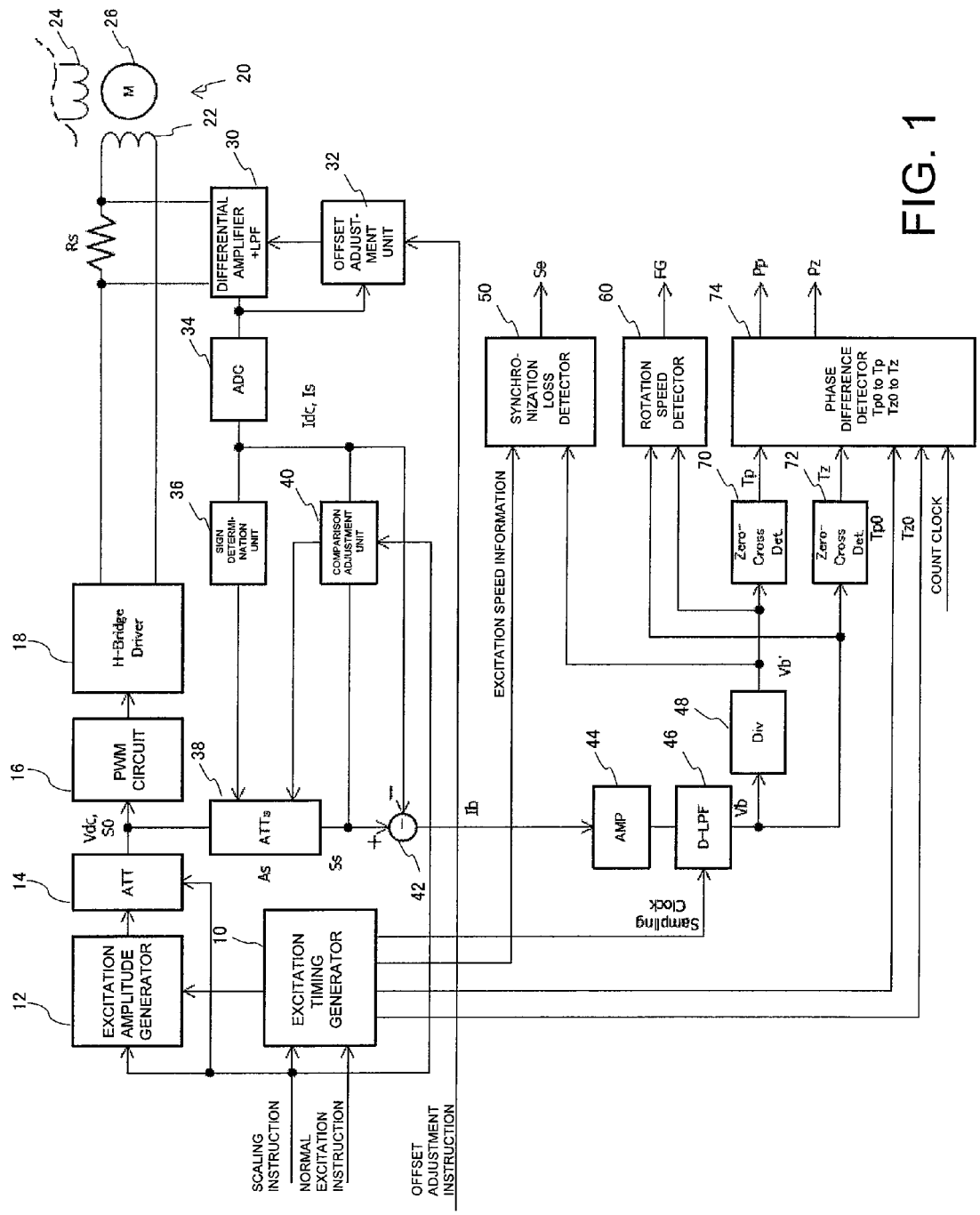
FIG. 1 is a view illustrating an overall structure of an embodiment of the present invention.

FIG. 1 is a block diagram illustrating the overall structure of a motor drive control circuit. In this illustrated example, a subject of driving is a stepping motor.

A scaling instruction for instructing detection of a scaling factor As or a normal excitation instruction for instructing performing normal excitation is supplied to an excitation timing generator 10.

When normal excitation is instructed by the normal excitation instruction, the excitation timing generator 10, based on a motor driving instruction at that time, generates a signal for excitation timing and supplies the signal to an excitation amplitude generator 12. The excitation amplitude generator 12 generates a motor application voltage instruction S0 which is appropriate for motor driving at that time and supplies the instruction S0 to an ATT circuit 14. The ATT circuit 14 applies amplitude adjustment to the motor application voltage instruction S0 and outputs the amplitude-adjusted motor application voltage instruction S0. When the scaling instruction is supplied, an application voltage instruction value Vdc suitable for detecting the scaling factor As is output from the ATT circuit 14.

The output from the ATT circuit 14 is supplied to a PWM circuit 16, which outputs a PWM control signal with a duty ratio in accordance with the instruction value which is the output from the ATT circuit 14.

The PWM control signal is supplied to an H-bridge driver 18, which is formed of a plurality of transistors. By switching these transistors, the H-bridge driver 18 controls an electric current from a power source to generate a motor current (a coil current), and supplies the motor current to a motor 20.

The motor 20, which is a stepping motor, includes two coils 22 and 24, and a rotor 26. The two coils 22 and 24 are shifted from each other by an electrical angle of 90°, so that the directions of the magnetic fields of the coils 22 and 24 with respect to the rotor 26 are also shifted from each other by an electrical angle of 90° about the central angle. Further, the rotor 26 includes a permanent magnet, for example, and the stable position thereof is determined in accordance with the magnetic field from the two coils 22 and 24. More specifically, by supplying alternating currents having phases different from each other by 90° to the two coils disposed so as to be shifted from each other by 90° with respect to the rotation angle of the rotor, it is possible to move and rotate the rotor 26 by their current phases. Also, by stopping the change of the current phase at a particular current phase timing, the rotor can be stopped at a position in accordance with the current phase at that time, thereby controlling rotation of the motor 20.

A resistor Rs is disposed in the current path of the coil 22, and a voltage in accordance with the current flowing in the coil 22, that is, the current flowing in the resistor Rs, is generated across the resistor Rs. The voltage across this resistor Rs is input to a differential amplifier 30, which provides the voltage across the resistor Rs. In this illustrated example, the differential amplifier 30 additionally includes a low-pass filter LPF, which removes fine variations in the output of the differential amplifier 30, so that a stable output can be obtained. Further, as the differential amplifier 30 generates offset, an offset adjustment unit 32 is connected to the differential amplifier 30 for performing offset adjustment based on an offset adjustment instruction. For example, the offset adjustment unit 32 detects and stores an output of the differential amplifier 30 when the driving current is 0, to thereby adjust the offset of the differential amplifier 30.

The signal for the motor driving current, which is output from the differential amplifier 30, is supplied to an ADC 34, where the input signal is converted to a digital signal. In the case of detection of a scaling factor by the scaling instruction, the output from the ADC 34 is a direct current motor current Idc at the time of non-rotation, and is a motor current (coil current) Is at the time of rotation.

The output from the ADC 34 is supplied to a sign determination unit 36, which determines the sign to detect the direction of current flowing in the resistor Rs. The detection result is then supplied to an ATTs circuit 38. The ATTs circuit 38 is a circuit which stores a scaling factor As and multiplies Vdc and S0 output from the ATT circuit 14 by this scaling factor As. At the time of scaling, the direct current motor current Idc is obtained by As·Vdc=Idc, and at the time of normal excitation, As·S0 is obtained.

The output from the ATTs circuit 38 is supplied to a comparison adjustment unit 40, to which a scaling instruction has been supplied. The comparison adjustment unit 40 compares As·Vdc supplied from the ATTs circuit 38 at the time of scaling with Idc supplied from the ADC 34, updates the scaling factor As, and supplies the updated As to the ATTs circuit 38.

As·S0, which is output from the ATTs circuit 38 at the time of normal excitation, is supplied to a subtractor 42, which subtracts Is, which is an output of the ADC 34 at the time of normal excitation, from As·S0 to calculate an induced current Ib corresponding to a speed electromotive voltage by As·S0−Is=Ib.

Specifically, S0 is a motor application voltage, and with the multiplication of S0 by the scaling factor As, the motor current component when no induced current is generated can be detected. Accordingly, by subtracting the motor current which is actually measured from As·S0, the induced current Ib can be calculated.

The induced current Ib obtained in the subtractor 42 is amplified by an amplifier (AMP) 44, and thereafter a digital low-pass filter (D-LPF) 46 removes high frequency noise thereof. A sampling clock is supplied to the digital low-pass filter 46 from the excitation timing generator 10. The excitation speed is generated by the excitation timing generator 10 based on an instruction, and with a sampling clock generated by this excitation timing generator 10, the cutoff frequency of the digital low-pass filter 46 is changed in accordance with the excitation speed and can be continuously set to an appropriate value.

The output of the digital low-pass filter 46 is supplied to a differentiator (Div) 48, from which a differential value Vb' is output. Here, the phase is advanced by 90 degrees by mean of differentiation by the differentiator 48.

The output of the differentiator 48 is supplied to a synchronization-loss detector 50, to which excitation speed information is also supplied from the excitation timing generator 10. The synchronization-loss detector 50 detects synchronization loss (a state of losing synchronization) by the information.

Further, Vb which is output from the digital low-pass filter 46 and Vb' which is output from the differentiator 48 are input to a rotation speed detector 60, which detects and outputs an FG signal concerning the number of rotation.

Also, Vb which is output from the digital low-pass filter 46 and Vb' which is output from the differentiator 48 are input to the respective zero-cross detection circuits 70 and 72. The zero-cross detection circuits 70 and 72 detect the respective zero-cross points and input the detection results to a phase difference detector 74. Two signals Tp0 and Tz0 concerning excitation timing having phases different from each other by 90 degrees from the excitation timing generator 10, and a count clock CLK, are supplied to this phase difference detector 74. The phase difference detector 74 then detects a phase difference between the motor application voltage and the speed electromotive voltage components Vb and Vb'.

Calculation of Induced Current Ib

Calculation of the induced current Ib will be described. For example, when, for a steady state in which the PM synchronous motor rotates at a fixed rotational speed, the operation is analyzed with respect to the dq axis, the voltage equation can be represented as follows:

$$\begin{pmatrix} Vd \\ Vq \end{pmatrix} = r \begin{pmatrix} id \\ iq \end{pmatrix} + \omega \begin{pmatrix} -Lq \cdot iq \\ Ld \cdot id + \phi m \end{pmatrix} \quad (1)$$

Here, Vd indicates a d-axis voltage; Vq indicates a q-axis voltage; r indicates a stator wire wound resistance; id indicates a d-axis current; iq indicates a q-axis current; ω indicates a rotation angular rate; Lq indicates a q-axis inductance; Ld indicates a d-axis inductance; and φm indicates a magnetic flux of the PM rotor.

The second term of this equation (1) represents speed electromotive voltage components, which can be rewritten, for each component, as follows:

(stator current of motor)=(terminal voltage/direct current resistance (DCR) component of stator coil)−(speed electromotive voltage component/DCR component of stator coil).

The above expression can be further rewritten as follows:

(speed electromotive voltage component/DCR component of stator coil)=(terminal voltage/direct current resistance (DCR) component of stator coil)−(stator current of motor).

As such, the first term on the right side of the equation (1) represents an electric current flowing in the stator coil when the speed electromotive force is 0.

When the stator is in a direct current excitation state, and is in a steady state, there is no effect of the inductance DSE components, and the electric current with respect to the motor application voltage is determined only by DCR components. Accordingly, it is possible to detect the induced current value (iv) of the speed electromotive voltage component, by subtracting the electric current value (Is) detected at the time of motor rotation from the electric current value (Ss) which is generated by applying the scaling factor (As), which is used at the time of identical scaling of the direct current motor current value (Idc) detected in the direct current excitation state and the direct current application voltage value (Vdc) in the direct current excitation state, to the terminal voltage value (S0) at the time of motor rotating operation.

More specifically, the above can be represented as Ib=As·S0−Is=Ss−Is. Here, the scaling of Vdc and S0 is identical, i.e., SDc:S0=1:1. Further, a scalar amount of 1/DCR has been multiplied for Ib, and the direction of the vector represents a speed electromotive voltage component (induced voltage component).

Figure 11:
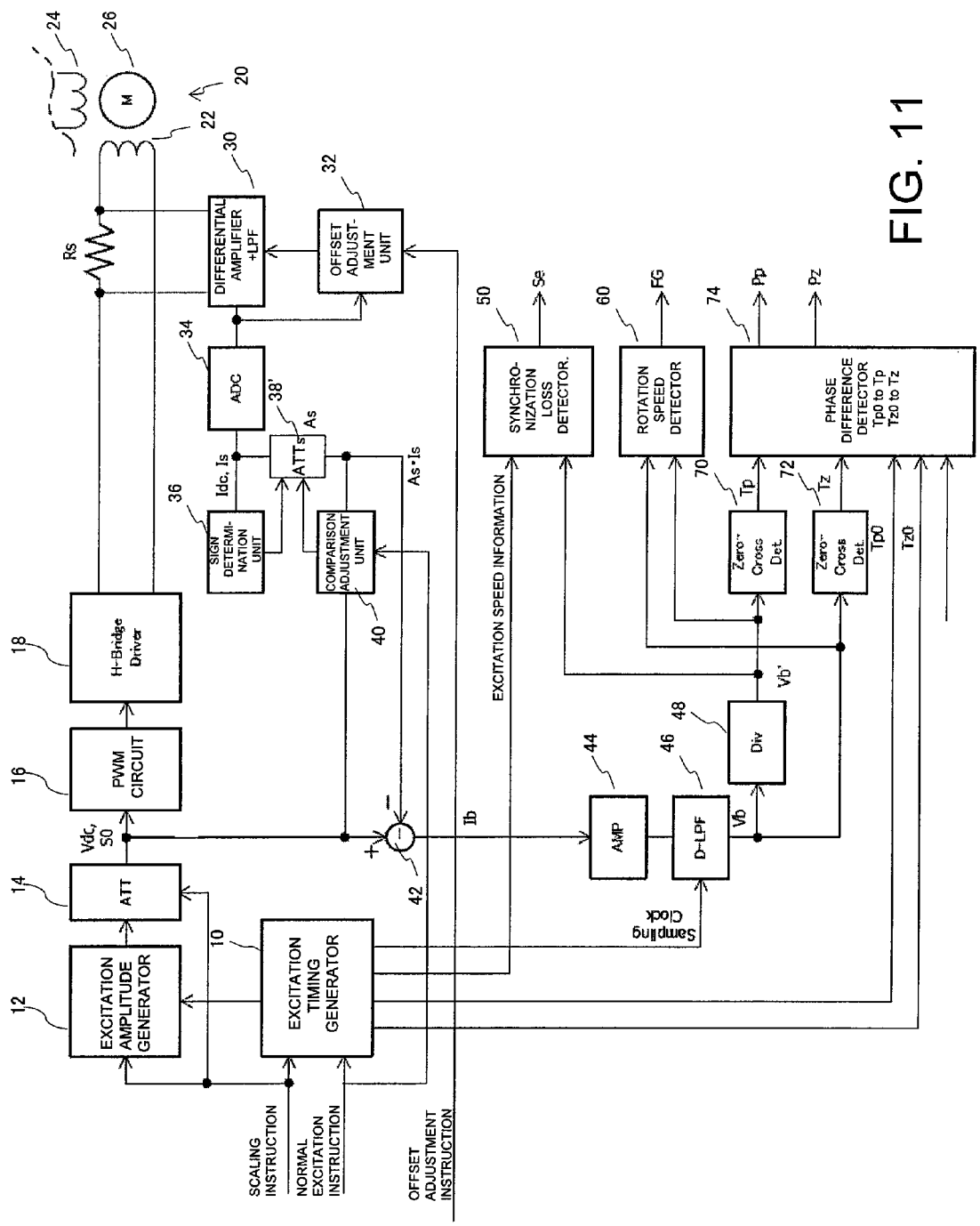
FIG. 11 is a view illustrating overall structure of another embodiment of the present invention.

The speed electromotive voltage component can be detected not only by the drive control circuit described in FIG. 1 but also by, for example, the drive control circuit described in FIG. 11. The drive control circuit illustrated in FIG. 11 adopts, in place of the ATTs circuit 38 illustrated in FIG. 1, an ATTs circuit 38' at a different position, and differs from the drive control circuit illustrated in FIG. 1 in that a signal to be detected is a speed electromotive voltage.

The ATTs circuit 38' is a circuit which stores a scaling factor As and multiplies the scaling factor As by Idc and Is output from the ADC 34. The direct current motor voltage Vdc is obtained by As·Idc at the time of scaling, and As·Is is obtained at the time of normal excitation.

Calculation of Induced Voltage Vb

Calculation of the induced voltage Vb will be described. When the operation is analyzed with respect to the dq axis, the voltage equation can be represented as follows:

$$\begin{pmatrix} Vd \\ Vq \end{pmatrix} = R \begin{pmatrix} id \\ iq \end{pmatrix} + \omega \begin{pmatrix} -Lq \cdot iq \\ Ld \cdot id + \phi m \end{pmatrix} \quad (2)$$

$$R = \begin{pmatrix} r + (d/dt)Ld \\ r + (d/dt)Lq \end{pmatrix} \quad (3)$$

The second term of this equation (2) represents speed electromotive voltage components, which can be rewritten for each component as follows:

(stator current of motor)=(terminal voltage/resistance component R of stator coil)−(speed electromotive voltage component/resistance component R).
Here, the resistance component R is a component indicated by equation (3).

The above expression can be further rewritten as follows:

(speed electromotive voltage component)=(terminal voltage)−(stator current of motor·resistance component R).

As such, the first term on the right side of the equation (2) represents an electric current flowing in the stator coil when the speed electromotive force is 0.

When the stator is in a direct current excitation state, and is in a steady state, there is no effect of the inductance DSE components and the electric current with respect to the motor application voltage is determined only by the resistance components R. Accordingly, it is possible to detect the speed electromotive voltage V0, by subtracting the value As·Is generated by applying the scaling factor (As) at the time of identical scaling of the direct current motor current value (Idc) detected in the direct current excitation state and the direct current application voltage value (Vdc) in the direct current excitation state to the electric current (Is) detected at the time of motor rotation, from the terminal voltage (S0) at the time of motor rotating operation. Here, it is preferable to perform filtering processing having a first-order delay transfer function based on direct current gain at the time of application of the scaling factor As. In other words, the scaling factor As is determined based on the inductance component of the stator of the motor.

Detection of Synchronization Loss

Figure 2:
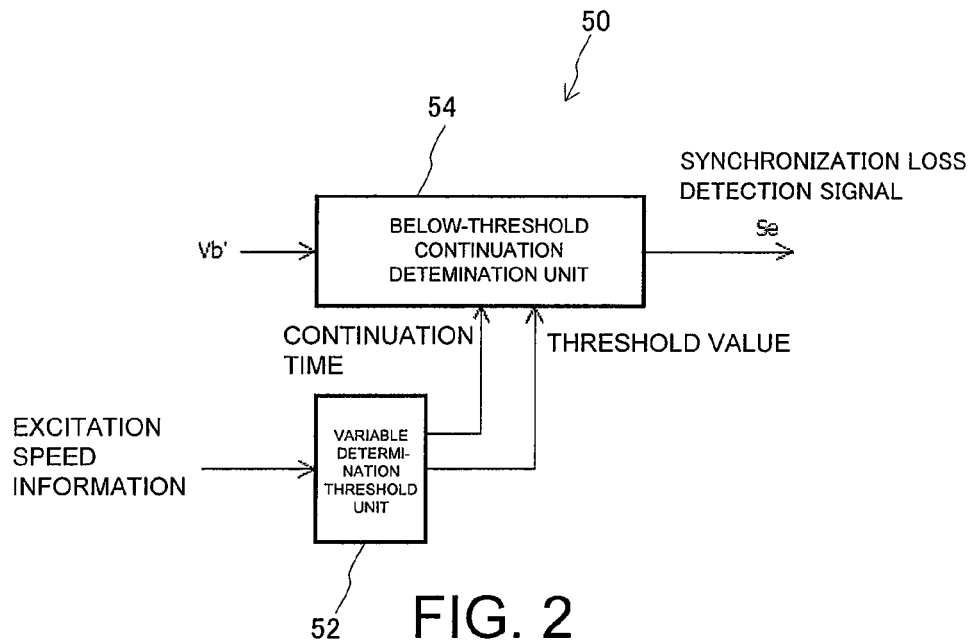
FIG. 2 is a view illustrating a structure of a synchronization loss detector.

FIG. 2 illustrates a structure of a synchronization loss detector 50. The excitation speed information from the excitation timing generator 10 is input to a variable determination threshold unit 52. The variable determination threshold unit 52, based on the excitation speed, determines a determination continuation time and a determination threshold value and supplies the determination continuation time and the determination threshold value to a below-threshold continuation determination unit 54. The below-threshold continuation determination unit 54 detects synchronization loss based on a state in which Vb' remains within a predetermined range for more than a predetermined time period.

Figure 3:
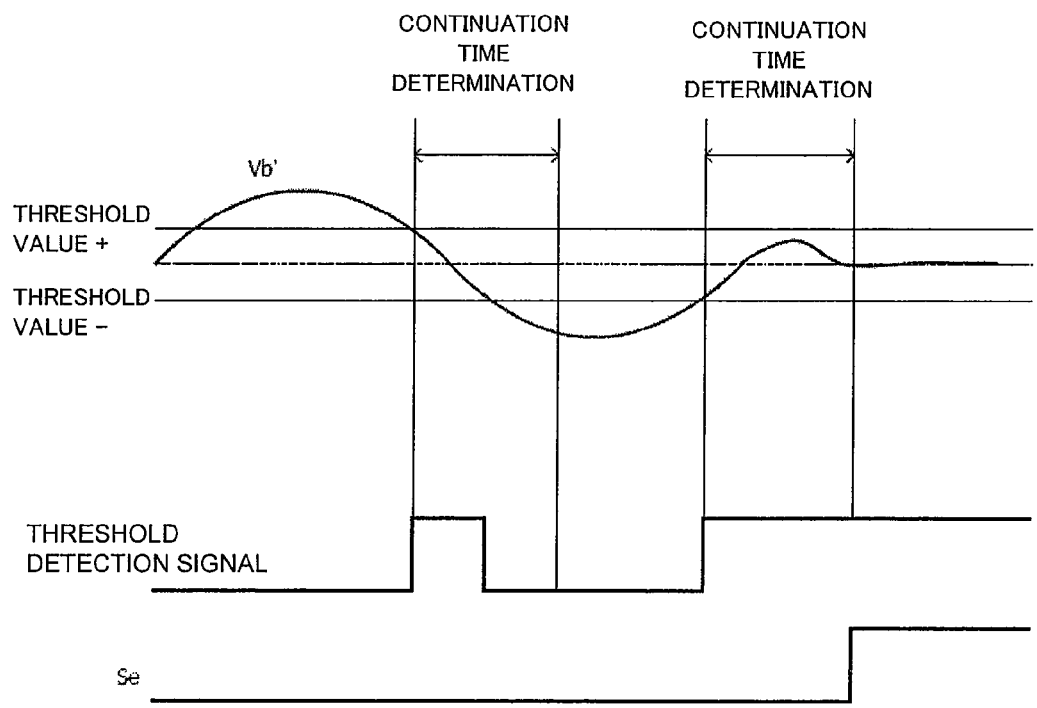
FIG. 3 is a view illustrating an operation of the synchronization loss detector.
Figure 4:
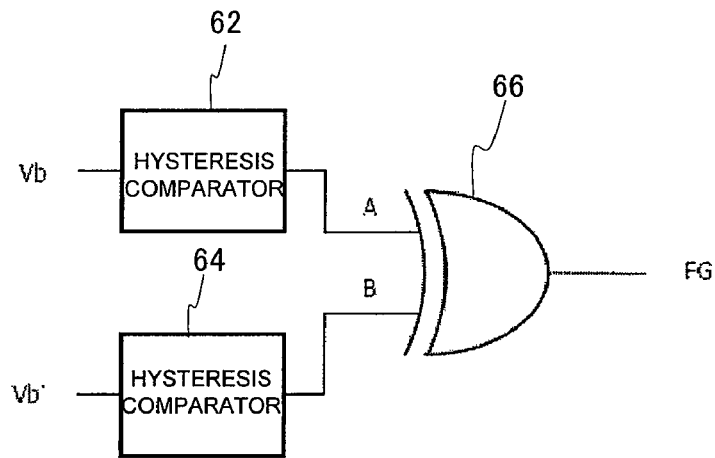
FIG. 4 is a view illustrating a structure of a rotation speed detector.

More specifically, as illustrated in FIG. 3, when the level of Vb' falls within a range between a threshold+ and a threshold− which are located in a symmetrical manner with respect to 0, a threshold determination signal at H level is generated. Then, when the threshold determination signal remains at the H level after elapse of a set continuation time period, a synchronization loss detection signal Se becomes H level. As Vb' is a differential amount of Vb, which is a speed electromotive voltage component, the amplitude component thereof is proportional to the rotation speed. Further, the frequency of Vb' corresponds to the number of rotation. Accordingly, the variable determination threshold unit 52, obtaining the excitation speed information at that time from the excitation timing generator 10, appropriately determines the determination threshold and the determination continuation time.

Rotation Speed Detection

Figure 5:
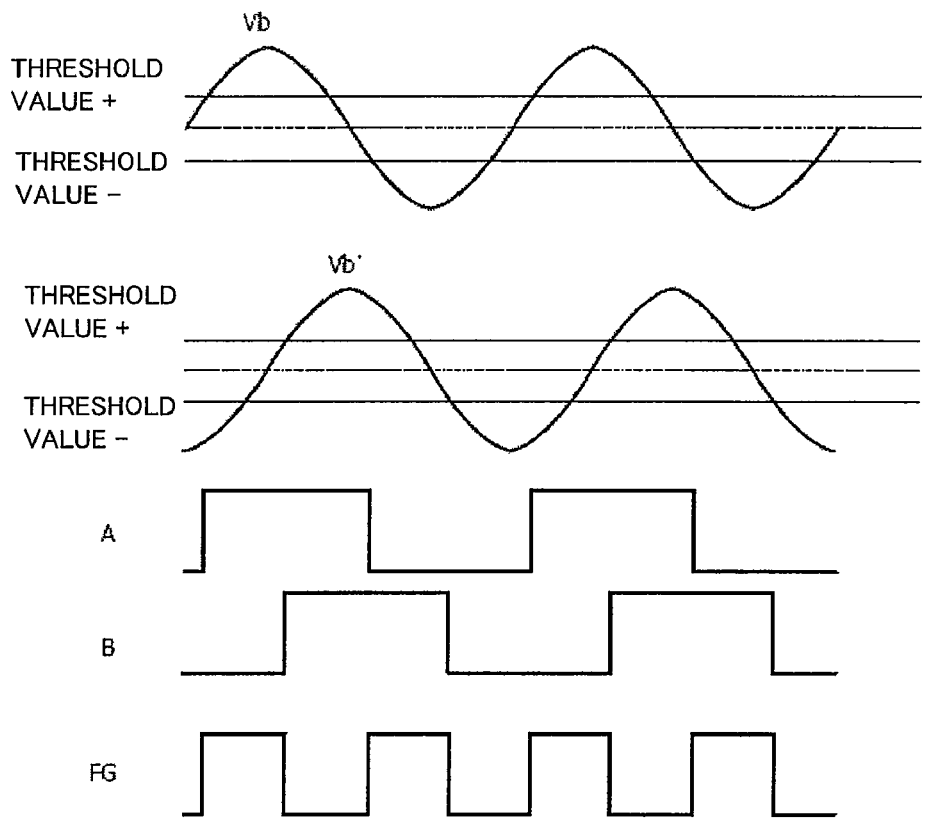
FIG. 5 is a view illustrating an operation of the rotation speed detector.

The rotation speed detector 60 generates, in synchronism with rotation of the motor, a rotation speed signal FG from the two signals Vb and Vb' having phases different from each other by 90 degrees. For this purpose, the signals Vb and Vb' are input to hysteresis comparators 62 and 64, respectively. As illustrated in FIG. 5, the hysteresis comparators 62 and 64 have a threshold+ and a threshold− which are located in a symmetrical manner with respect to 0, and output H level when the threshold value+ is exceeded and return the signal level to L level when the input signal is below the threshold value−. The hysteresis comparators 62 and 64 output determination signals A and B having phases different from each other by 90 degrees, respectively, which are then input to an EX-OR circuit 66. Accordingly, an FG signal having a frequency twice as much as those of the signals Vb and Vb' can be obtained from the EX-OR circuit 66. Here, it is preferable that the threshold+ and the threshold− which are used in the synchronization loss detector 50 are also used in the hysteresis comparators 62 and 64.

Phase Difference Detection

Figure 6:
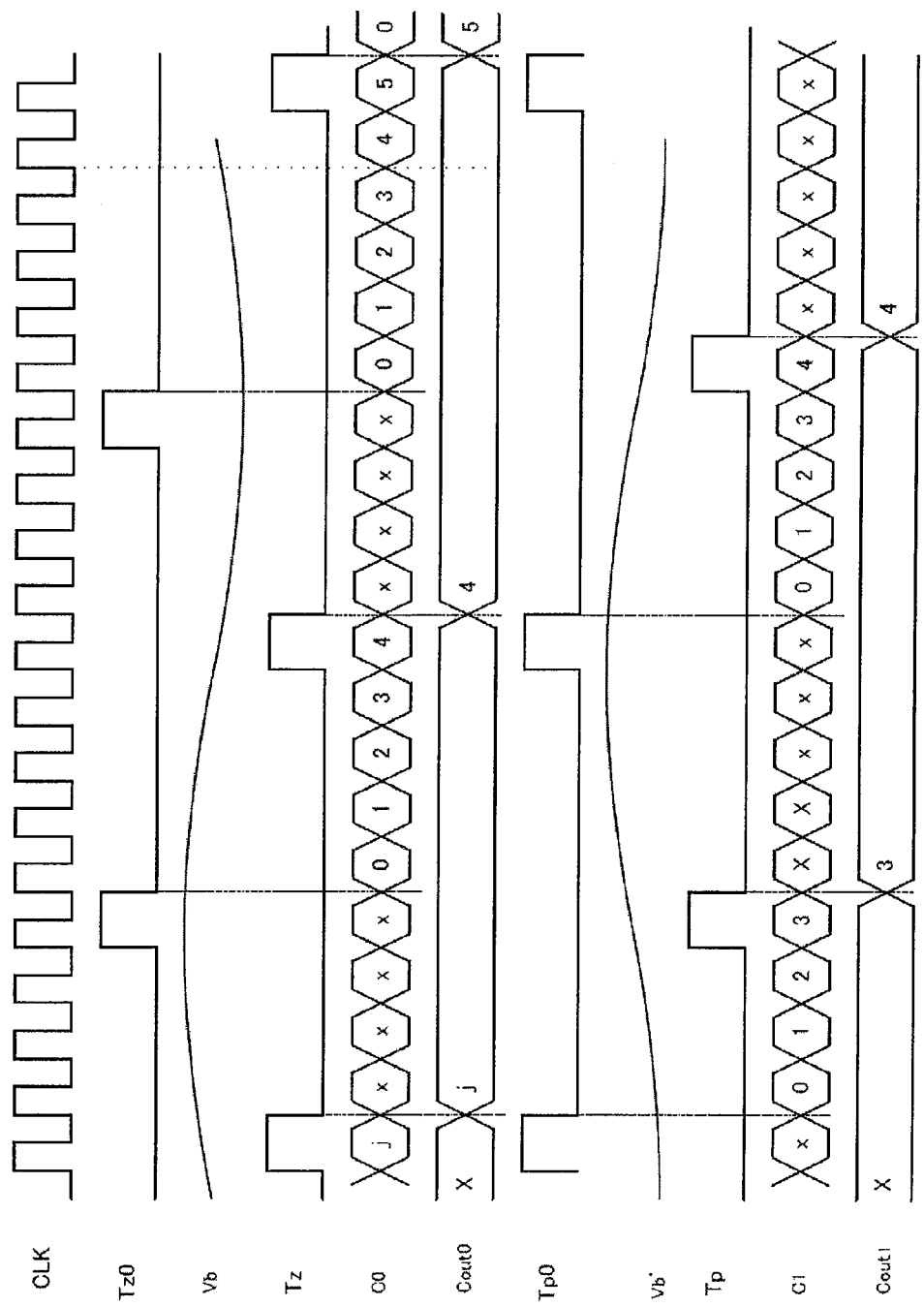
FIG. 6 is a view illustrating an operation of phase difference detection.

The phase difference detector 74 detects a phase difference between the driving voltage phase and the speed electromotive voltage from the zero cross points of Vb and Vb'. This operation will be described with reference to FIG. 6. The excitation timing generator 10 has two signals Tp0 and Tz0 for motor application voltage control, so as to perform driving with phases different from each other by 90 degrees with respect to the two coils 22 and 24 of the motor 20. These signals Tp0 and Tz0 are in synchronism with the motor application voltage and have a frequency twice as much as that of the motor application voltage (which is the same frequency as that of the FG signal). On the other hand, a signal Tz concerning the zero cross of Vb and a signal Tp concerning the zero cross of Vb' are also supplied to the phase difference detector 74.

Further, the phase difference detector 74 has two counters which perform counting from the fall of Tz0 to the fall of Tz and which perform counting from the fall of Tp0 to the fall of Tp, respectively. Consequently, two count values C0 and C1 are generated in these two counters, and when Tz and Tp fall, the count values at that time are obtained as Count0 and Count1, respectively.

Here, as the detection circuit has offset, it is possible to subtract a predetermined constant Pc from the count values Cout0 and Cout1 obtained as described above, to obtain a phase difference between the motor application voltage and the speed electromotive power.

The phase of the speed electromotive power with respect to the motor application voltage changes in accordance with the motor application voltage. Signals Pp and Pz indicative of the phase difference information, which are output from the phase difference detector circuit 74, are output to the ATT circuit 14. The ATT circuit 14 performs processing of amplitude adjustment based on these signals Pp and Pz. Accordingly, by controlling the phase of this speed electromotive power appropriately, optimization control of the driving power can be performed.

Other Embodiments

Figure 7:
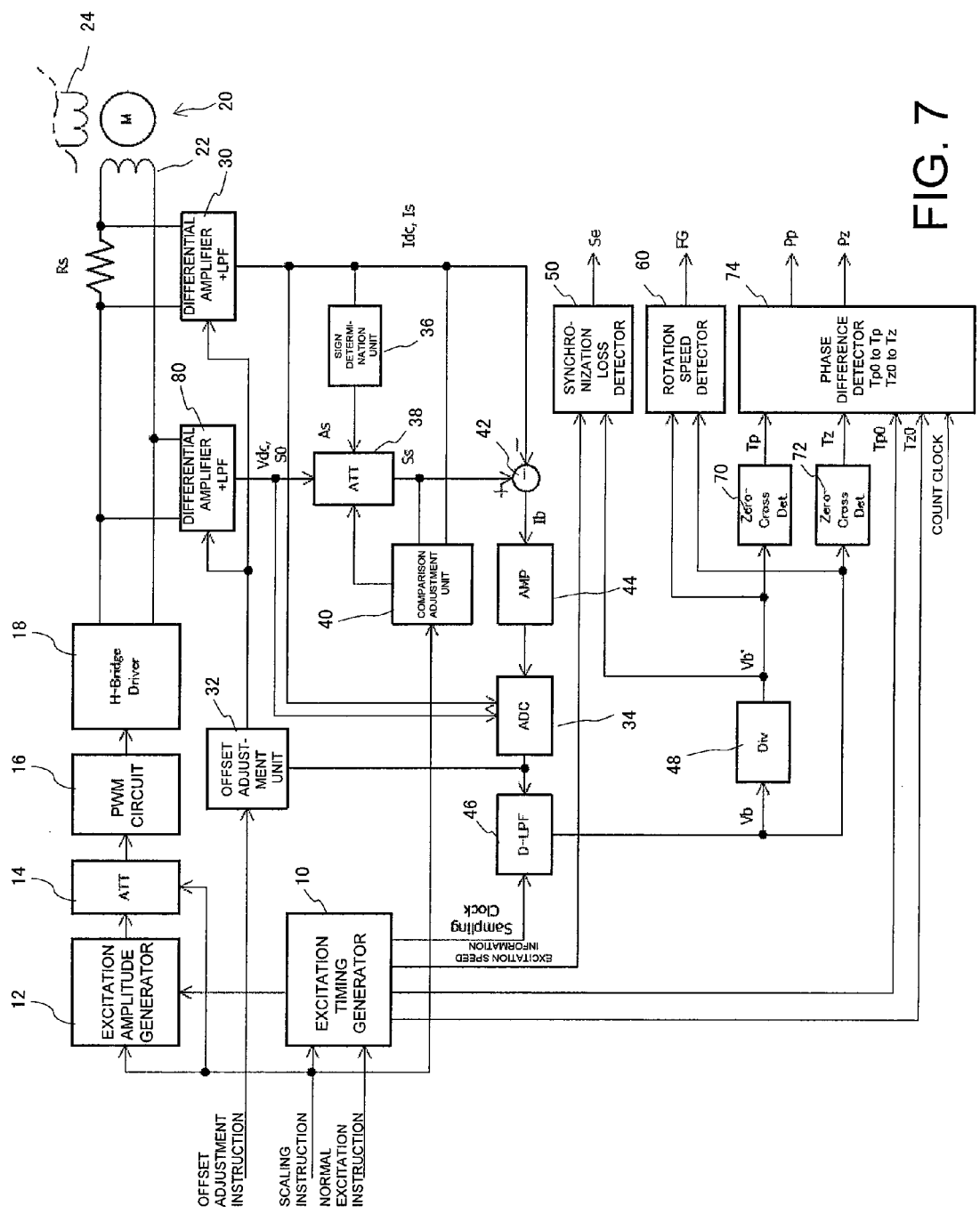
FIG. 7 is a view illustrating overall structure of another embodiment of the present invention.

FIG. 7 illustrates another embodiment. This example includes a differential amplifier 80 for detecting the motor application voltage, which is an output of the H-bridge driver 18. Accordingly, the direct current application voltage Vdc and the motor application voltage S0 are obtained at the output of this differential amplifier 80. Further, the subtraction processing performed by the subtractor 42, i.e. Ib=As·S0−Is, and detection of As by the comparison adjustment unit 40, are also performed by analog signal processing.

Then, the output of the subtractor 42 is supplied, via the amplifier 44, to the ADC, where Ib is converted to digital data for subsequent processing.

Figure 8:
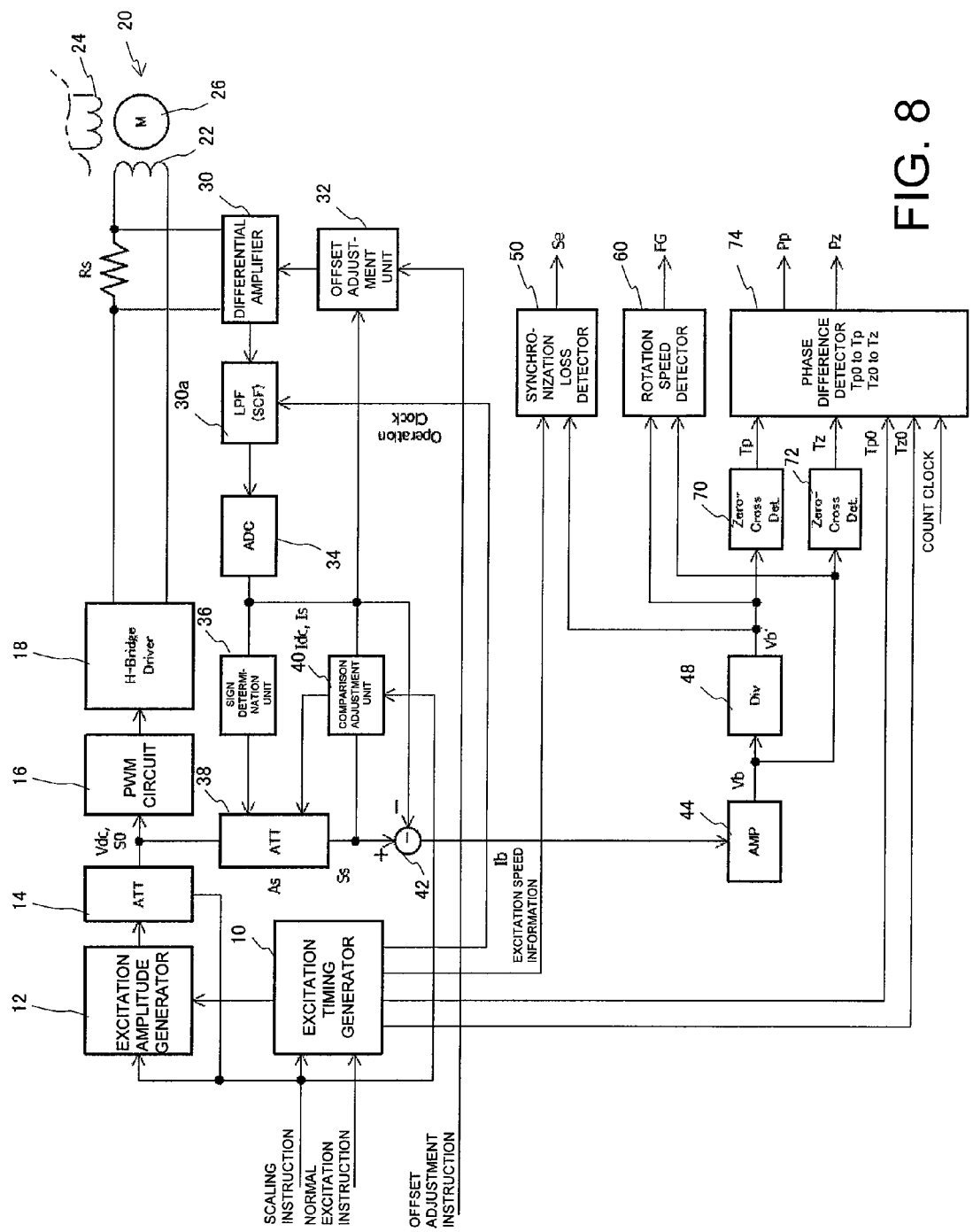
FIG. 8 is a view illustrating a structure of still another embodiment of the present invention.

FIG. 8 illustrates an embodiment corresponding to the embodiment illustrated in FIG. 1, and adopts a low-pass filter 30a formed of a switched capacitor as a low-pass filter for the output of the differential amplifier 30. A switched capacitor filter is capable of changing the cutoff frequency by an operation clock thereof. Accordingly, with this structure, it is possible to change the operation clock in accordance with the frequency of the motor driving to thereby control the cutoff frequency to be continuously optimal.

Figure 9:
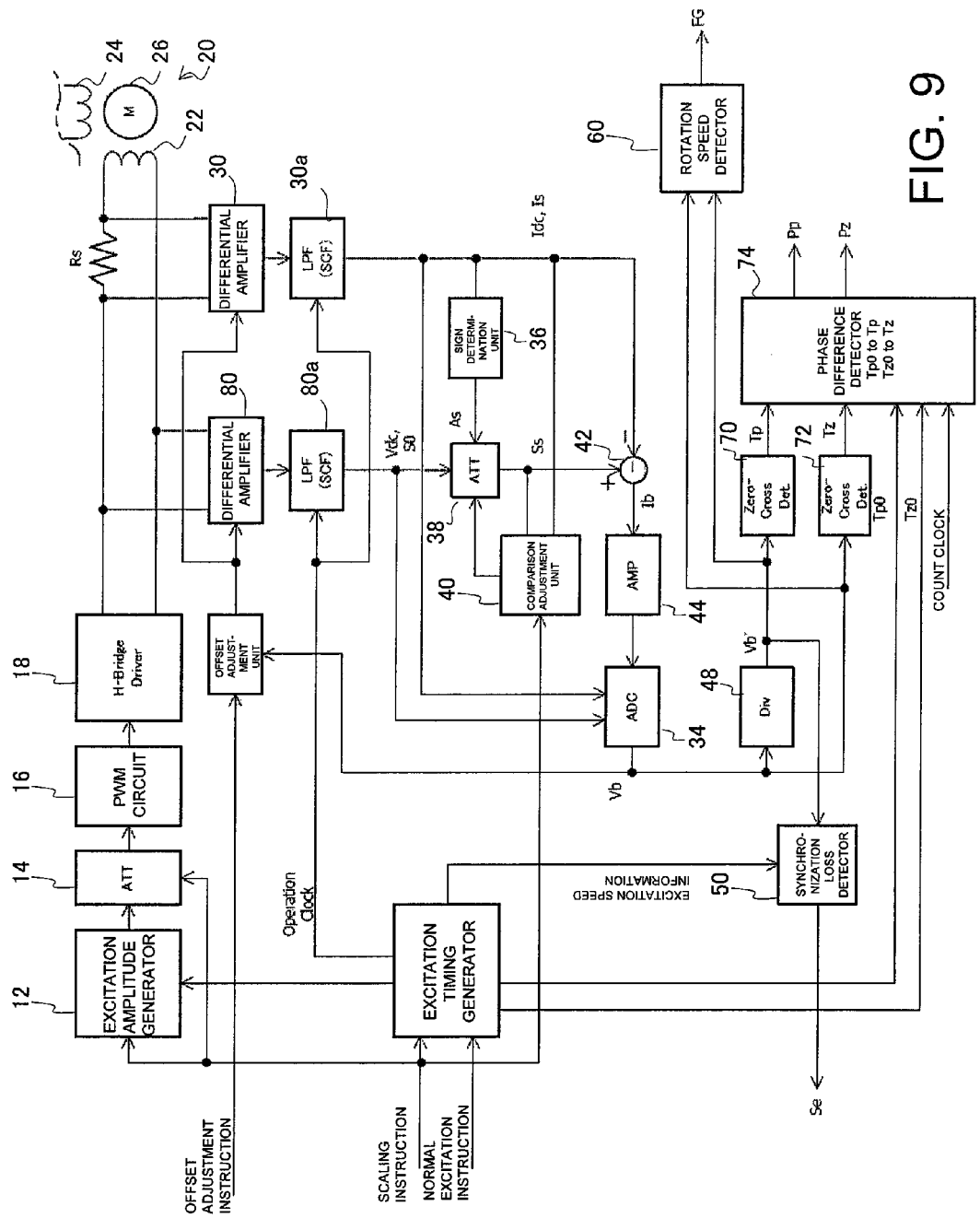
FIG. 9 is a view illustrating a structure of a further embodiment of the present invention.

FIG. 9 illustrates an embodiment corresponding to the embodiment illustrated in FIG. 7, and adopts low-pass filters 30a and 80a each formed of a switched capacitor as low-pass filters for the differential amplifiers 30 and 80, respectively.

Structure of H-bridge Driver 18

Figure 10:
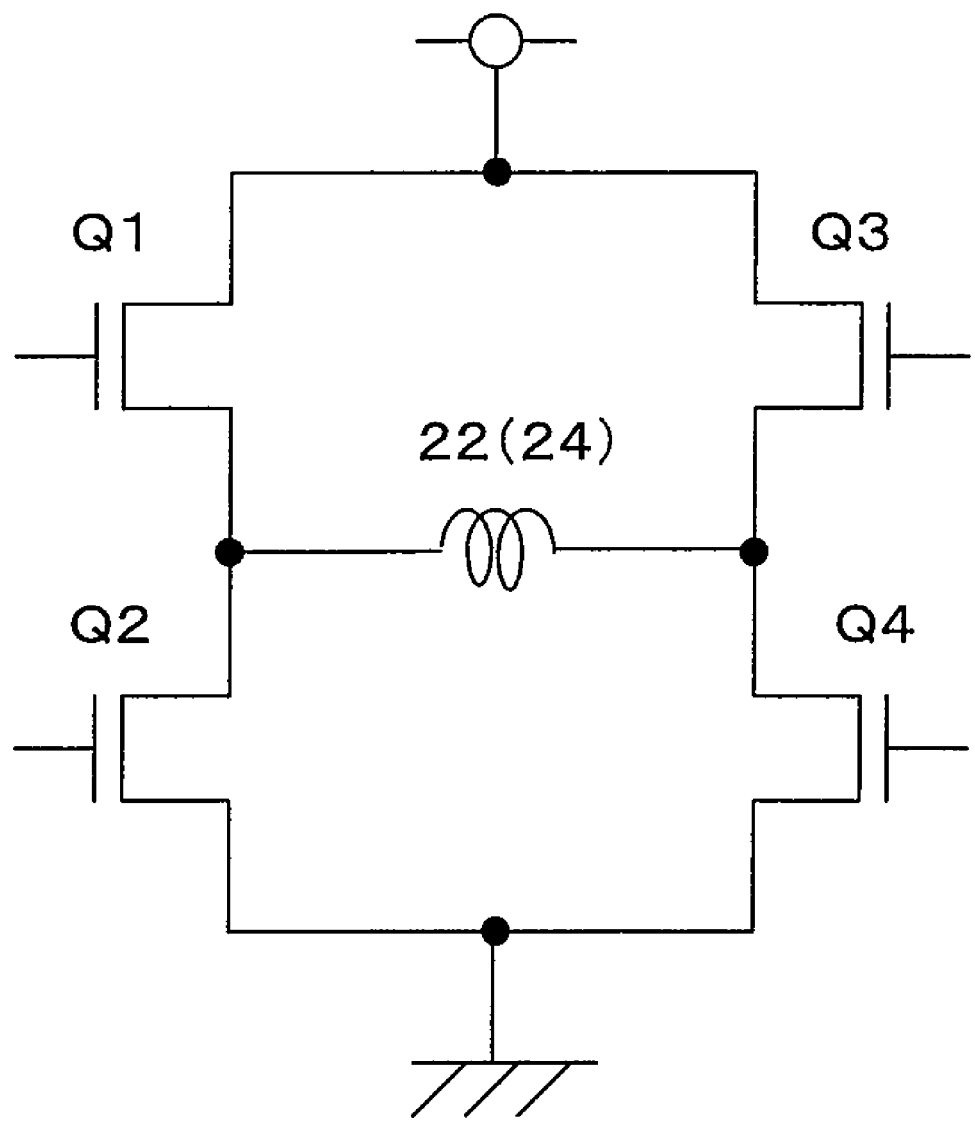
FIG. 10 is a view illustrating a structure of an H-bridge drive.

FIG. 10 illustrates the structure of a portion of the H-bridge driver 18 and one of the coils 22 (24) of the motor 20.

As illustrated, an arm formed of two transistors Q1 and Q2 which are connected in series and an arm formed of two transistors Q3 and Q4 which are connected in series are provided between a power source and ground, and the coil 22 (24) is connected between the intermediate point of the transistors Q1 and 2 and the intermediate point of the transistors Q3 and 4. Electric current in one direction is caused to flow in the coil 22 (24) by turning the transistors Q1 and Q4 ON and turning the transistors Q2 and Q3 OFF, and electric current in the opposite direction is caused to flow in the coil 22 (24) by turning the transistors Q1 and Q4 OFF and turning the transistors Q2 and Q3 ON, thereby driving the coils 22 and 24.

By providing two such circuits as described above, it is possible to control the electric current to be supplied to the two coils 22 and 24 individually.

Advantages of the Embodiments

As described above, according to each embodiment, it is possible to continuously obtain the induced current Ib during the steady operation. Consequently, the phase detection of the induced current can be performed based on Ib thus obtained. Further, as the motor application voltage is known, by detecting the phase difference between the motor application voltage and the induced current, it is possible to control the application voltage of the stepping motor to an appropriate voltage for use in high efficiency control of the stepping motor. Also, with the detection of the phase difference, spark-advance control can also be performed. In addition, by detecting the change of the induced current Ib to be a predetermined value or less, loss of synchronization can also be detected.

Further, with a logical operation of the induced current Ib (or the speed electromotive voltage Vb) and differential Ib' of Ib (or Vb') having a phase different from Ib (Vb) by 90 degrees, an FG signal is generated, and the FG signal can be counted to thereby detect the rotation speed.

Moreover, as the phase difference between the two coils is known, by comparing Ib and Ib' for the two coils to detect the positions of the coils, the rotation direction can also be detected. While in the embodiment described above, Vb and Vb' are used in place of Ib and Ib', as Vb, Vb' and Ib, Ib' are in a proportional relationship and the amplitude is irrelevant to phase difference detection and rotation speed detection, the detection can be performed in a similar manner. Here, Vb and Vb' can be obtained by multiplication of As by Ib and Ib', respectively. This multiplication of As is performed by the amplifier 44 to obtain Vb.

While the preferred embodiments of the present invention have been described using specific terms, such description is for illustrative purposes only, and it is to be understood that changes and variations may be made without departing from the spirit or scope of the appended claims.

What is claimed is:

1. A motor driving control circuit for controlling an application voltage to a coil of a synchronous motor, comprising:
   a current detector which detects a coil current flowing in the coil at the time of steady rotation of the synchronous motor;
   a voltage detector which detects an application voltage to the coil at the time of steady rotation of the synchronous motor;
   a multiplier which multiplies the coil current or the application voltage by a predetermined scaling factor;
   an induced power detector which calculates a difference between a component of the coil current and a component of the application voltage to obtain an induced power signal in accordance with an induced power of the synchronous motor; and
   a controller which controls the application voltage to the synchronous motor based on the induced power signal.

2. The motor driving control circuit according to claim 1, further comprising:
   a scaling factor detector which obtains the scaling factor from a ratio of the application voltage and a motor current detected at the time of non-rotation of the synchronous motor.

3. The motor driving control circuit according to claim 1, further comprising:
   a scaling factor detector which obtains the scaling factor from a ratio of the application voltage and a motor current detected at the time of non-rotation of the synchronous motor, and an inductance component of a stator of the synchronous motor.

4. The motor driving control circuit according to claim 1, further comprising:

a rotation speed signal generator which obtains a rotation speed signal having a frequency in accordance with a rotation speed of the synchronous motor, based on a logical operation of the induced power signal and a differential signal of the induced power signal.

5. The motor driving control circuit according to claim 1, wherein a phase difference between the induced power signal and the application voltage is obtained, and driving of the motor is controlled based on the phase difference which is obtained.

* * * * *